United States Patent
Schimanz

(10) Patent No.: US 7,296,371 B2
(45) Date of Patent: Nov. 20, 2007

(54) BANNER

(76) Inventor: Gerhard Schimanz, Ringweg 26, A-9061, Wölfnitz (AT)

( * ) Notice: Subject to any disclaimer, the term of this patent is extended or adjusted under 35 U.S.C. 154(b) by 0 days.

(21) Appl. No.: 10/531,272

(22) PCT Filed: Oct. 9, 2003

(86) PCT No.: PCT/AT03/00304

§ 371 (c)(1),
(2), (4) Date: Nov. 11, 2005

(87) PCT Pub. No.: WO2004/036533

PCT Pub. Date: Apr. 29, 2004

(65) Prior Publication Data

US 2006/0130375 A1    Jun. 22, 2006

(30) Foreign Application Priority Data

Oct. 14, 2002  (AT) .............................. GM680/2002

(51) Int. Cl.
*G09F 21/12* (2006.01)
(52) U.S. Cl. .......................................... 40/215; 40/604
(58) Field of Classification Search ................. 40/215, 40/212, 604; 244/154, 1 TD, 3; 273/360, 273/361; 414/563
See application file for complete search history.

(56) References Cited

U.S. PATENT DOCUMENTS

| 1,893,149 A | * | 1/1933 | Picco | 40/215 |
| 1,901,855 A | * | 3/1933 | Du Pont | 40/215 |
| 1,963,772 A | * | 6/1934 | Bohannon et al. | 40/215 |
| 1,974,039 A | * | 9/1934 | Gilbert et al. | 40/215 |
| 2,064,218 A | * | 12/1936 | Richardson | 40/215 |
| 2,094,890 A | * | 10/1937 | Hoyt | 40/215 |
| 2,194,869 A | * | 3/1940 | Pike | 40/215 |
| 2,238,875 A | * | 4/1941 | Manson | 273/360 |
| 2,419,549 A | * | 4/1947 | Griesinger et al. | 273/360 |
| 2,486,999 A |   | 11/1949 | Tapp et al. | |
| 2,991,959 A | * | 7/1961 | Rizzo | 244/3 |
| 3,614,033 A | * | 10/1971 | McCarty, Jr. | 244/48 |
| 3,670,440 A | * | 6/1972 | Yost | 40/215 |
| 3,683,530 A | * | 8/1972 | Robinson | 40/215 |
| 4,178,706 A | * | 12/1979 | Boyce | 40/326 |
| 4,364,578 A | * | 12/1982 | Ikeda et al. | 280/93.507 |
| 4,381,117 A | * | 4/1983 | French et al. | 280/204 |
| 4,384,817 A | * | 5/1983 | Peterson | 414/563 |
| 5,102,063 A | * | 4/1992 | Brum | 244/1 TD |
| 5,102,145 A | * | 4/1992 | Luttrell | 273/360 |

FOREIGN PATENT DOCUMENTS

DE        489 529        9/1930
DE     298 19 485        3/1999

* cited by examiner

*Primary Examiner*—William L. Miller
(74) *Attorney, Agent, or Firm*—Young & Thompson

(57) ABSTRACT

A banner (1), which can be dragged by an airplane (2) using a drag rope (3), includes a banner rod (5) which is connected to the drag rope (3) by way of a banner spider (4). Disks (10) acting as trailing wheels are arranged on the banner rod (5) on both sides of the banner (1). The banner rod (5) is held at a distance from the surface of the runway prior to starting off, such that the banner does not lie on the runway as a result of the wind produced by propeller of the airplane (2), thereby enabling the airplane (2) to start off with a coupled banner 1without any problem.

16 Claims, 4 Drawing Sheets

BANNER

BACKGROUND OF THE INVENTION

The invention relates to a banner as is towed by aircraft and bears for example advertising.

The known banners have a banner rod which is connected to the front end of the banner and which is also connected via the so-called "banner spider" and via a tow rope to the aircraft which is towing the banner.

In known banners it is not possible to connect them via the tow rope to the aircraft which is to tow the banner before take-off.

Therefore the process takes place such that the banner is placed optionally folded on the runway and the banner spider is connected via a short connecting cable to the so-called "loop" (closed cable loop). The loop is attached to two rods so that one part is tensioned and the other part to which the banner spider is attached sags down. An aircraft to which a tow rope with hooks on the free end is attached at this point flies over the loop such that the upper horizontal piece of the loop is coupled to the tow rope.

This is not only a time-consuming, but also an unsafe flight activity since there is the danger that the landing gear of the aircraft will hang up in the loop or the hook on the tow rope will become caught for example on the ground; in the worst case this leads to the aircraft's crashing.

SUMMARY OF THE INVENTION

The object of the invention is to develop a banner of the initially named type such that it can be connected to the aircraft which is towing the banner before take-off.

Preferred and advantageous embodiments of the banner as claimed in the invention are the subject matter of the dependent claims.

Because disks which keep the banner rod at a distance from the ground are attached to the banner rod, the banner rod and the banner attached to it including the spider can be connected to the aircraft via the tow rope before take-off. The "wind" generated by the propeller of the aircraft which is taking off lifts the banner off the ground since the banner rod due to the disks is at a distance from the ground, therefore from the surface of the runway. Thus it is possible to take off without difficulties.

There can be any number and type of disks which are used for example as wheels on the banner rod and they depend among others on the size (width) of the banner and its weight. But often two disks are sufficient.

Other details, features and advantages of the invention follow from the description below with reference to the drawings in which one embodiment is shown.

DETAILED DESCRIPTION OF INVENTION

Figure 1:
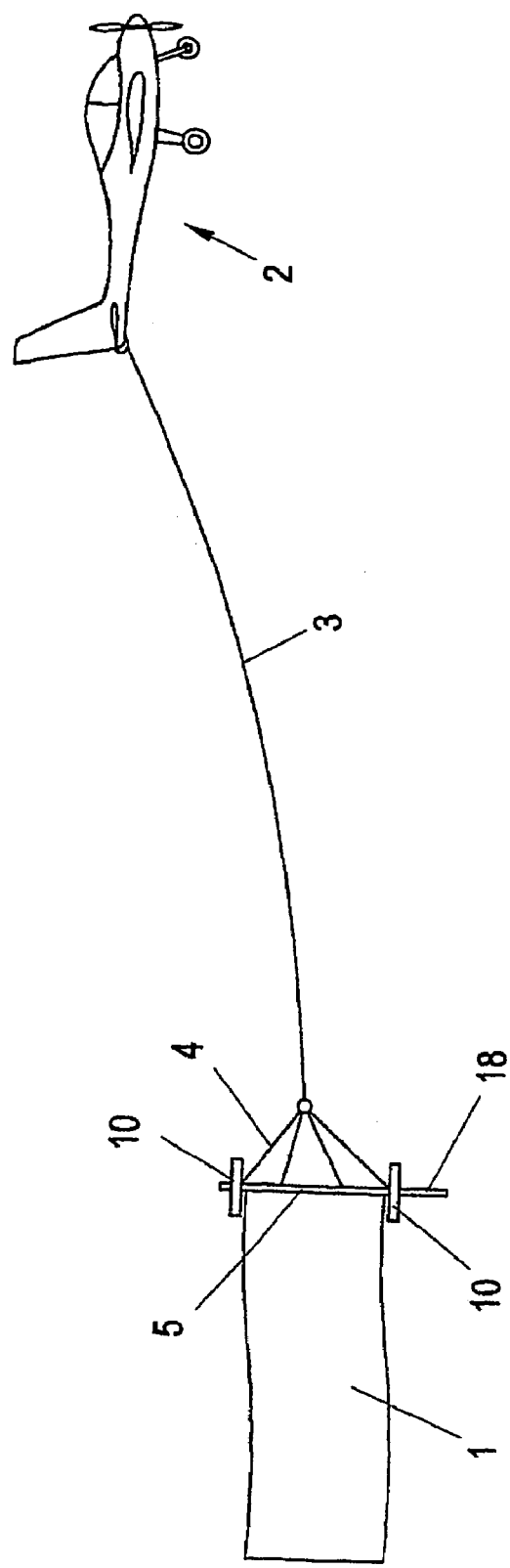
FIG. 1 shows in a schematic a banner which is being towed by an aircraft.

As is shown in FIG. 1, a banner 1 is being towed by an aircraft 2 to which it is coupled via a tow rope 3 and a banner spider 4. On the front end of the banner 1 there is a banner rod 5 on which there are disks 10 (wheels) on either side of the banner 1.

Figure 2:
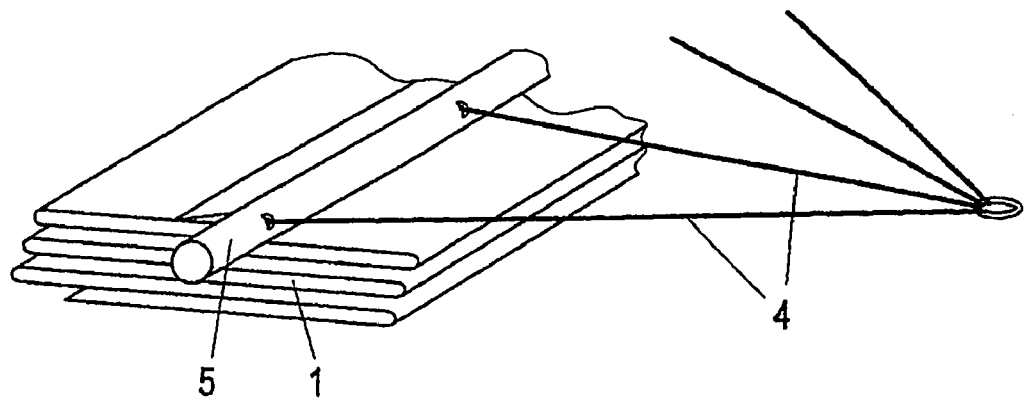
FIG. 2 shows the banner which has been placed on the ground partially in an oblique view.
Figure 3:
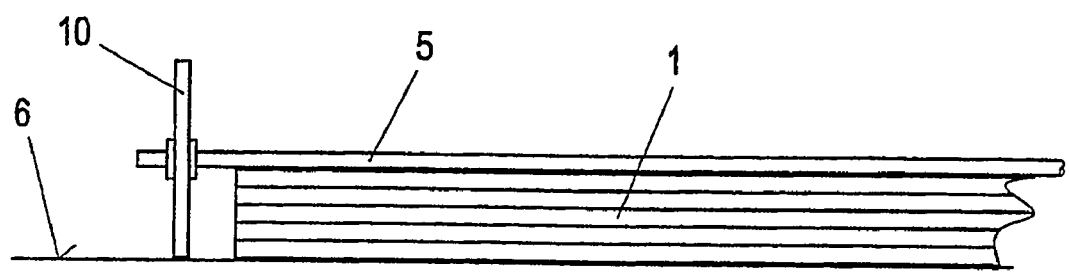
FIG. 3 shows the banner (partially) in a view from the front.

Before take-off, the banner 1, as is shown in FIGS. 2 and 3, optionally folded, is placed on the runway 6, the disks 10 which are provided on the ends of the banner rod 5, in addition to the banner 1 which has been placed folded, resting on the surface of the runway 6 (these disks 10 are not shown in FIG. 2). This situation is shown in FIG. 3.

If now the aircraft 2 takes off, the banner 1 which on its front end which is connected to the banner rod 5 is held by the disks 10 at a distance from the surface of the runway 6, at least over most of its length will be located at a distance over the runway 6 due to the wind of the propeller so that it does not hinder the take-off of the aircraft 2 by dragging on the ground 6.

To keep the braking effect of the banner 1 and the banner rod 5 small, the disks 10 are mounted on the banner rod 5 preferably with a capacity to turn (freely), therefore they act as wheels.

Figure 4:
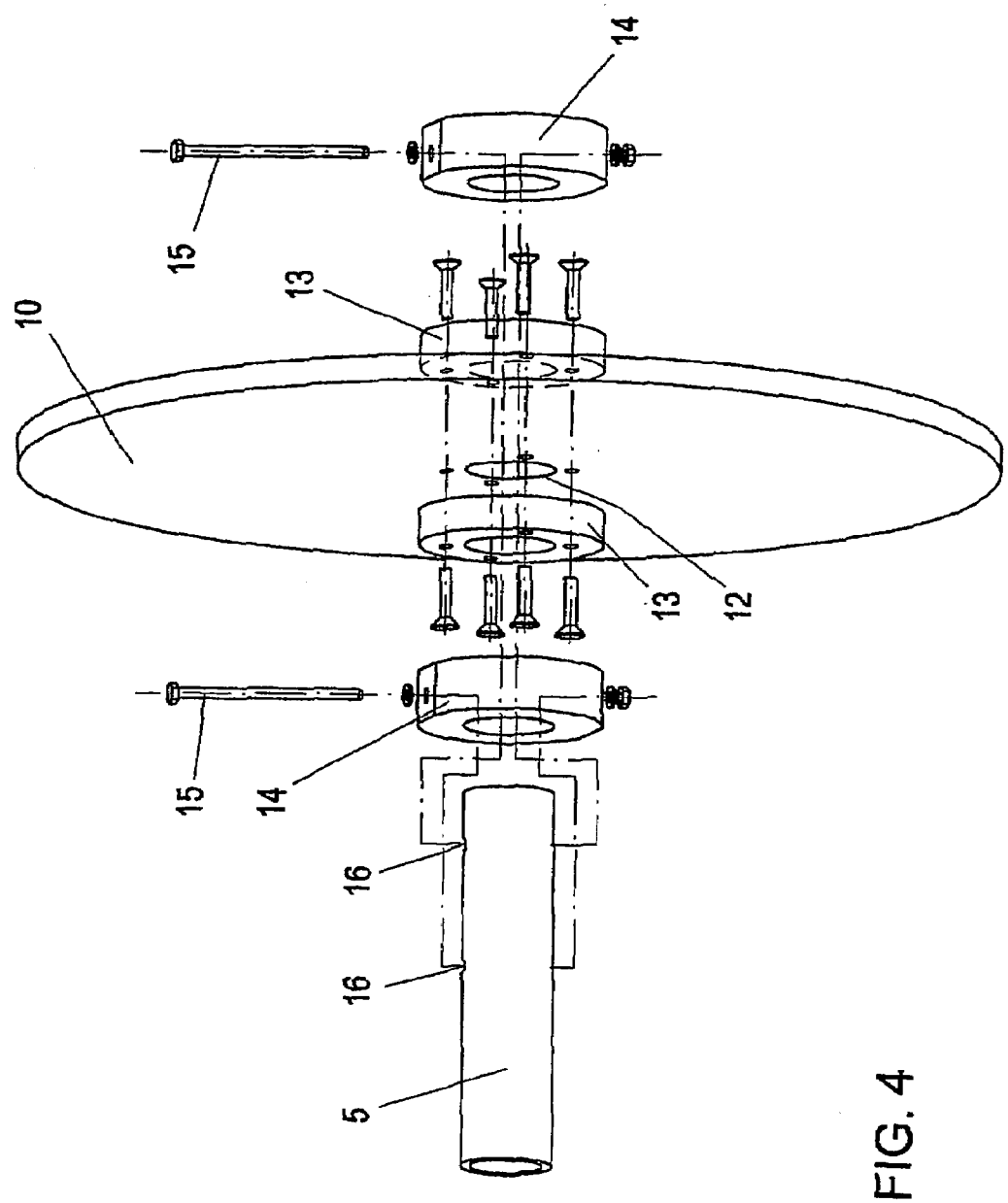
FIGS. 4 and 5 show the disks being used as wheels on the end of the banner rod, in a disassembled view.
Figure 5:
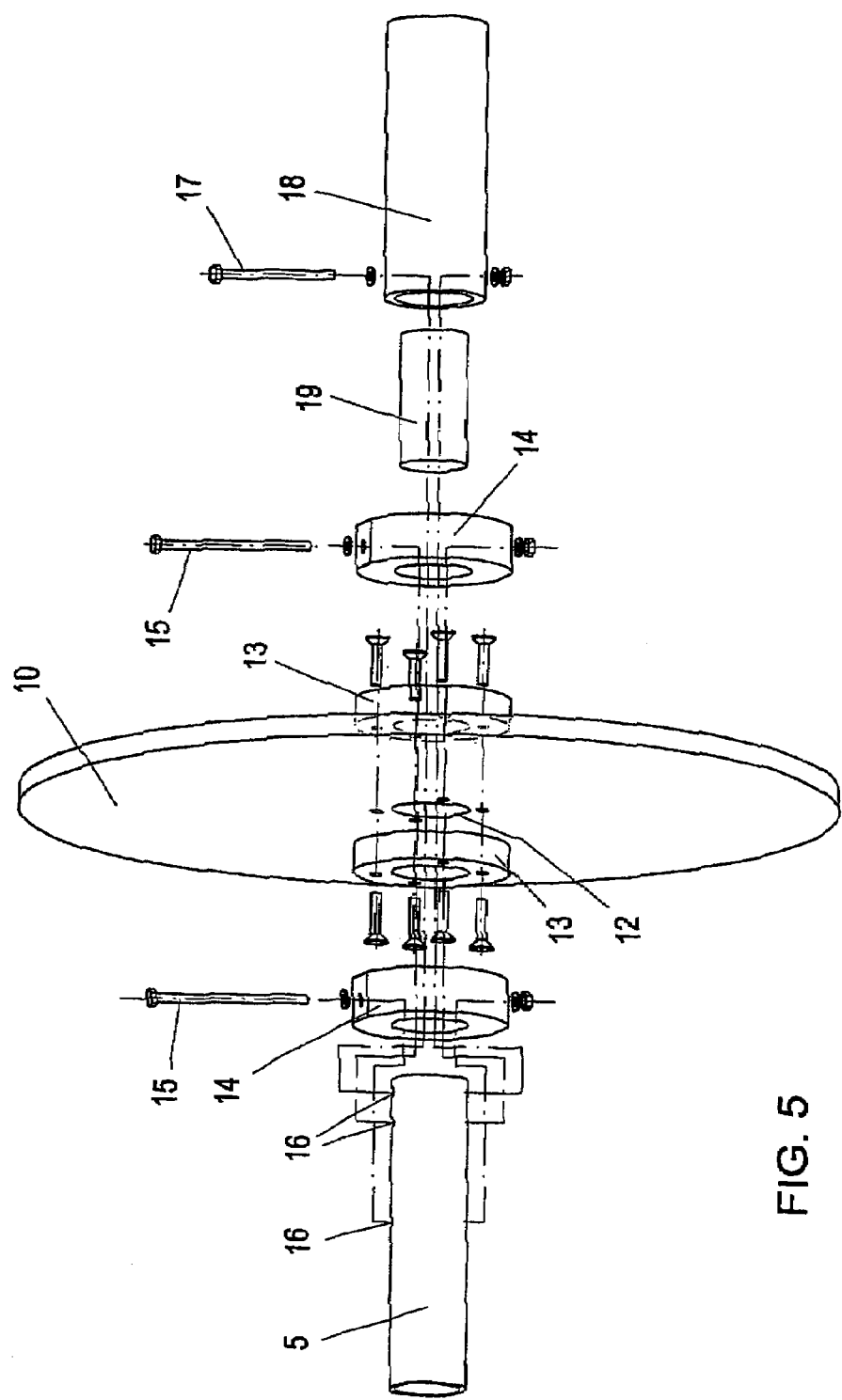

One possible embodiment of the disks 10 which act as wheels is shown in FIGS. 4 and 5 each in a disassembled view.

FIG. 4 shows the disk 10 which is round and is reinforced to the right and left of its bearing opening 12 by running disk flanges 13 which are screwed on or riveted on so that it can run evenly and as much as possible without friction on the banner rod 5. To the right and left of the disk 10 which is provided with the running disk flanges 13 there are brackets 14 which are connected to the banner rod 5 using screws 15 which extend through holes 16 in the banner rod 5. Between these brackets 14 the disk 10 is pivotally held as a wheel.

The end of the banner rod which is shown in FIG. 4 is the end "without weight", conversely the end shown in FIG. 5 is the end of the banner rod "with weight" 19 which on the outer end of the banner rod 5, therefore outside the disk 10, is attached by a screw 17 to the banner rod 5. The weight 19 and the dive hose 18 which is likewise attached with a screw 17 to the banner rod 5 result in that the banner rod 5 and thus the banner 1 assume an essentially vertical position when being towed by an aircraft 2 during flight since the end of the banner rod 5 with the weight 19 and the dive hose 18 points down.

In summary one embodiment of the invention can be described as follows:

A banner 1 which is to be towed via a tow rope 3 by an aircraft 2 has a banner rod 5 which is connected to the tow rope 3 via a banner spider 4. On either side of the banner 1 on the banner rod 5 disks 10 which are used as running wheels are pivotally mounted. In this way the banner rod 5 before take-off is kept at a distance from the surface of the runway 6 so that under the action of the "wind" generated by the propeller of the aircraft 2 the banner 1 does not rest on the runway 6, therefore the aircraft 2 can take off easily with the banner 1 attached.

The invention claimed is:

1. An aerial banner assembly for an aircraft, the banner assembly comprising:
   a banner adapted to display advertising thereon;
   a banner rod attached to a front end of the banner;
   a banner spider attached to the banner rod;
   a tow rope having a first end attached to the banner spider and a second end adapted to be attached to the aircraft;
   and at least two round disks rotatably mounted on the banner rod which provide running wheels.

2. Banner as claimed in claim 1, wherein the disks (10) are located, and rotatably mounted, on the ends of the banner rod (5) next to two lengthwise edges of the banner (1).

3. The banner assembly as claimed in claim 2, wherein the disks (10) on either side have running disk flanges (13) and via said flanges (13) sit on the outer surface of the banner rod (5).

4. The banner assembly as claimed in claim 3, further comprising brackets (14) that secure the running disk flanges on either side of the disks (10).

5. The banner assembly as claimed in claim 1, wherein the disks (10) on either side have running disk flanges (13) and via said flanges (13) sit on the outer surface of the banner rod (5).

6. The banner assembly as claimed in claim 1, further comprising brackets (14) that secure the running disk flanges on either side of the disks (10).

7. The banner assembly as claimed in claim 6, wherein the brackets (14) are connected to the banner rod (5).

8. The banner assembly as claimed in claim 7, wherein the brackets (14) are attached to the banner rod (5) using screws (15) which pass through the banner rod (5).

9. The banner assembly as claimed in claim 5, wherein the disks (10) are located, especially pivotally mounted, on the ends of the banner rod (5) next to two lengthwise edges of the banner (1).

10. The banner assembly as claimed in claim 1, wherein there is a weight (19) on one end of the banner rod (5).

11. The banner assembly as claimed in claim 10, wherein the end of the banner rod (5) provided with the weight (19) is lengthened by a dive hose (18).

12. The banner assembly as claimed in claim 11, wherein the weight (19) and the dive hose (18) are connected to the banner rod by a screw (17) which passes through the banner rod (5).

13. The banner assembly as claimed in claim 10, wherein the disks (10) are located, and rotatably mounted, on the ends of the banner rod (5) next to two lengthwise edges of the banner (1).

14. The banner assembly as claimed in claim 13, wherein the disks (10) on either side have running disk flanges (13) and via said flanges (13) sit on the outer surface of the banner rod (5).

15. The banner assembly as claimed in claim 14, further comprising brackets (14) that secure the running disk flanges on either side of the disks (10).

16. The banner assembly as claimed in claim 10, wherein the disks (10) on either side have running disk flanges (13) and via said flanges (13) sit on the outer surface of the banner rod (5).

\* \* \* \* \*